US011544861B2

United States Patent
Lancelle et al.

(10) Patent No.: US 11,544,861 B2
(45) Date of Patent: Jan. 3, 2023

(54) METHOD FOR ALIGNING A THREE-DIMENSIONAL MODEL OF A DENTITION OF A PATIENT TO AN IMAGE OF THE FACE OF THE PATIENT RECORDED BY CAMERA

(71) Applicant: Ivoclar Vivadent AG, Schaan (LI)

(72) Inventors: Marcel Lancelle, Zürich (CH); Roland Mörzinger, Attersee am Attersee (AT); Nicolas Degen, Erlenbach (CH); Gábor Sörös, Budapest (HU); Bartolovic Nemanja, Zürich (CH)

(73) Assignee: Ivoclar Vivadent AG, Schaan (LI)

( * ) Notice: Subject to any disclaimer, the term of this patent is extended or adjusted under 35 U.S.C. 154(b) by 222 days.

(21) Appl. No.: 16/967,942

(22) PCT Filed: Feb. 13, 2019

(86) PCT No.: PCT/EP2019/053557
§ 371 (c)(1),
(2) Date: Aug. 6, 2020

(87) PCT Pub. No.: WO2019/162164
PCT Pub. Date: Aug. 29, 2019

(65) Prior Publication Data
US 2021/0366136 A1 Nov. 25, 2021

(30) Foreign Application Priority Data

Feb. 21, 2018 (EP) ..................................... 18157809

(51) Int. Cl.
*G06T 7/00* (2017.01)
*G06T 7/33* (2017.01)
(Continued)

(52) U.S. Cl.
CPC ................ *G06T 7/344* (2017.01); *G06T 7/13* (2017.01); *G06T 7/70* (2017.01); *G06V 40/165* (2022.01);
(Continued)

(58) Field of Classification Search
CPC .. G06T 7/344; G06T 7/13; G06T 7/70; G06T 2207/20021; G06T 2207/20224; G06T 2207/30036; G06V 40/165
See application file for complete search history.

(56) References Cited

U.S. PATENT DOCUMENTS

| 2013/0218530 A1 | 8/2013 | Deichmann |
| 2017/0049311 A1 | 2/2017 | Borovinskih et al. |

FOREIGN PATENT DOCUMENTS

CN 105581851 A 5/2016

*Primary Examiner* — Michael R Neff
(74) *Attorney, Agent, or Firm* — Ann M. Knab; Thad McMurray (57) ABSTRACT

The present invention relates to a computer implemented method for aligning a three-dimensional model (6) of a patient's dentition to an image of the face of the patient recorded by a camera (3), the image including the mouth opening, comprising:
estimating the positioning of the camera (3) relative to the face of the patient during recording of the image to obtain an estimated positioning,
retrieving the three-dimensional model (6) of the dentition of the patient,
rendering a two-dimensional image (7) of the dentition of the patient using the virtual camera (8) processing the three-dimensional model (6) of the dentition at the estimated positioning,
carrying out feature detection in a dentition area in the mouth opening of the image (1) of the patient recorded by the camera (3) and in the rendered image (7) by performing edge detection and/or a color-based tooth
(Continued)

likelihood determination in the respective images and forming a detected feature image for the or each detected feature, calculating a measure of deviation between the detected feature images of the image taken by the camera (3) and the detected feature image of the rendered image, varying the positioning of the virtual camera (8) to a new estimated positioning and repeating the preceding three steps in an optimization process to minimize the deviation measure to determine the best fitting positioning of the virtual camera (8).

18 Claims, 3 Drawing Sheets

(51) Int. Cl.
*G06T 7/13* (2017.01)
*G06T 7/70* (2017.01)
*G06V 40/16* (2022.01)

(52) U.S. Cl.
CPC ............... *G06T 2207/20021* (2013.01); *G06T 2207/20224* (2013.01); *G06T 2207/30036* (2013.01)

METHOD FOR ALIGNING A THREE-DIMENSIONAL MODEL OF A DENTITION OF A PATIENT TO AN IMAGE OF THE FACE OF THE PATIENT RECORDED BY CAMERA

CROSS-REFERENCE TO RELATED APPLICATIONS

This application is a National Stage application of International patent application PCT/EP2019/053557 filed on Feb. 13, 2019, which claims priority to European patent application No. 18157809.7 filed on Feb. 21, 2018, the disclosures of which are incorporated herein by reference in their entirety.

FIELD OF THE INVENTION

The present invention relates to a computer implemented method for aligning a three-dimensional model of a patient's dentition to an image of the face of the patient recorded by a camera, the image including the mouth opening, the method comprising the steps: estimating the positioning of the camera relative to the face of the patient during recording of the image, and rendering a two-dimensional image of the dentition using a virtual camera processing the three-dimensional model data of the dentition, wherein the virtual camera is operating using the estimated positioning of the camera.

The three-dimensional model of a dentition of a patient is a digital three-dimensional model of the dentition which is generated as a basis representing the current state of the dentition before a dental treatment or any other dental modification is planned. The three-dimensional model of the dentition therefore corresponds to the dentition in the image of the mouth opening recorded by the camera. The three-dimensional model of the dentition has usually been obtained by scanning and/or phototechnical acquisition of the oral cavity of the patient, or by scanning the shape of the dentition taken as impressions in casting compound material in impression trays.

The invention may be used in a dental Augmented Reality application to preview a dental situation, which is the result of any modification of the current state of the dentition e.g., after a planned dental treatment, with teeth position correction devices in place or including any other modification of the current state of the dentition. The modified state of the dentition of the patient (e.g. after dental treatment) is referred to as the dental situation in the present application. The dental treatment can be planned using computer-implemented dental treatment design tools starting from the three-dimensional model of the dentition and creating a modified three-dimensional model of a dental situation after the treatment. Another option is to create a physical model of the dentition and to modify to any dental alteration to obtain a physical model of the planned dental situation which is then scanned. The planned dental situation may include one or more new dental prostheses or other dental restorations, or a corrected teeth arrangement as a result of corrections of teeth positions, for example by use of dental braces. Dental situations in the sense of this application also include the state of a patient's dentition during a teeth position correction treatment when position correcting devices such as dental braces and retainers are in place on the teeth.

BACKGROUND OF THE INVENTION

For dentists and patients, it is of interest to get a visual impression of the appearance of the face with a modified dental situation, i.e. to visualize the modified dental situation in an image of the face of the patient. Also, the appearance during a dental treatment including teeth position correction devices such as dental braces and retainers may be of importance for the patient before deciding to undergo such treatment. For this purpose, a virtual preview (virtual mock-up) of the dentition modified by dental treatment and/or a preview of the patient wearing the braces/retainers is helpful for the dentist and may also be used in the course of interactively modifying the treatment plan to get the most favorable aesthetic results.

In this respect it has already been proposed in WO 2017/085160 A1 to overlay a three-dimensional model of a dental situation in an image taken by a camera, wherein in the described method biometric face reference points are automatically identified in the image recorded by the camera, and the recognized face points are analyzed to determine the orientation of the head of the patient in the image and to identify the area of the mouth opening in the image. The three-dimensional model is then oriented and aligned such that it fits to the determined orientation of the face of the patient in the image, and is overlaid in the mouth opening of the image. No details are disclosed how a two-dimensional image of the dental situation is generated from the three-dimensional model. In practice, this method allows for a rough alignment but the position of the virtual dentition is not very precise and robust.

U.S. Pat. No. 9,775,491 B2, which forms the basis of the preamble of claim 1, discloses a computer implemented method for aligning a three-dimensional model of a dental situation to an image of the face of the patient recorded by a camera. In this method a three-dimensional model of the oral cavity of the patient is obtained. This three-dimensional model is modified in a dentistry treatment plan by applying dental restorations to obtain a three-dimensional model of the dental situation of the patient dentition after application of the dental restorations. A two-dimensional image of the face of the patient including the mouth opening is obtained. Then the positioning of the camera that recorded the image relative to the dentition of the patient is estimated. In the context of this application "positioning of the camera" is including the three-dimensional position x, y, z in space and the angular orientation of the camera with respect to the face of the patient. A virtual camera using the estimated positioning is processing the three-dimensional model of the dental situation to obtain a two-dimensional image, and a portion of the three-dimensional model of the dental situation is selected which is visible to the virtual camera. The image rendered by the virtual camera is overlaid and displayed in the image taken by the camera. It has been found that estimating the positioning of the camera often does not lead to satisfying results of the visualization because already small deviations in the positioning of the virtual camera from the positioning of the real camera result in unrealistic effects of the visualization of the dentition in the mouth opening of the image recorded by the camera. Already small deviations in the orientation of the rendered image of the dental situation from the orientation of the oral cavity in the image taken by the camera may lead to awkward aesthetic impressions in the composed image. For this reason, it would be desirable to be able to precisely align a three-dimensional model of the dentition of the patient to an image of the face of the patient showing part of the dentition in the mouth opening; such alignment could then also be used to visualize a modified dental situation derived from the three-dimensional model of the dentition in a correctly positioned manner in an image of the face of the patient.

SUMMARY OF THE INVENTION

It is an object of the present invention to improve a method for aligning a three-dimensional model of a dentition of a patient with respect to a two-dimensional image of the face of a patient including the mouth opening taken by a camera that ensures a precise and reliable alignment.

This object is achieved by the computer implemented method comprising the features of the claims. Preferred embodiments of the invention are set out in the dependent claims.

This object is achieved by the computer implemented method comprising the features of claim 1. Preferred embodiments of the invention are set out in the dependent claim.

In the computer implemented method for aligning a three-dimensional model of a dentition of a patient to an image of the face of the patient a three-dimensional model of the dentition of the patient is retrieved. This model has been created before by scanning the oral cavity of the patient or by scanning the impression of the dentition taken by impression trays filled with impression material. Such three-dimensional model of the dentition of the patient may anyhow already be present when it forms the basis for developing a digital dental treatment plan, for example by adding artificial teeth or other dental restorations or by modifying the dental situation in another manner, for example by correction of teeth positions.

The three-dimensional model of the dentition is then rendered by the virtual camera as a two-dimensional image of the dentition, wherein the virtual camera is operated assuming an estimated positioning which is estimated to coincide with the positioning of the real camera when recording the image of the patient's face.

The image of the face of the patient (the image does not have to include the entire face, the region of the mouth opening is sufficient) and the rendered image are then separately processed by carrying out feature detection in a dentition area inside the mouth opening in the respective images by performing edge detection and/or color-based tooth likelihood determination in the respective images. For the detected feature (edges or tooth likelihood) or for each of the detected features (edges and tooth likelihood), this results in two detected feature images (one resulting from the camera image and one from the rendered image) which are then used to calculate a measure of deviation between the detected feature images. Ideally, if the estimated positioning should already coincide with the real positioning of the camera when recording the face image, the measure of deviation would be zero or very small since the detected features (edges or tooth likelihood pattern) would be in identical positions in the two images, and therefore there would be no deviation of the detected features in the two images. However, in practice there will be a certain deviation at the beginning when an estimated positioning of the virtual camera is used. For this reason, the method continues to vary the positioning of the virtual camera to a new estimated positioning and repeats the preceding steps of generating a new rendered image using the virtual camera with the new estimated position and calculates the measure of deviation in this new positioning. These steps of rendering a new two-dimensional image at the new estimated positioning, feature detection in the newly rendered image, and calculating the measure of deviation are then iteratively repeated in an optimization process to minimize the deviation measure to determine the best fitting positioning of the virtual camera.

There are many iterative numerical optimization algorithms which are suitable to be used in the computer implemented method for optimizing the positioning of the virtual camera to give the best fit to the positioning of the real camera when recording the image of the patient's face. One option is to use a gradient descent optimization algorithm. Since the skilled person in this area is familiar with such programmed optimization algorithms no further details are specified in this respect here.

It is also clear that instead of minimizing a deviation measure a quantity inverse to the deviation measure, which could be referred to as a matching score, could be maximized. Whether a deviation (or error) measure is minimized or a matching score is maximized is merely a designation of the same process with different terms.

Feature detection by way of color-based tooth likelihood determination is the assignment of a tooth-likelihood value (from 0 to 1, or 0 to 100%) to each picture element of the image by determining how well the actual color values of a picture element fit to an expected color range expected for teeth. For example, if the color of a picture element is within a core area of a probability distribution expected for teeth a color-based tooth likelihood value of 1 is assigned, and for all other color values the tooth likelihood assigned is smaller the further the color values are distanced from the expectation values. Effectively, this assigns a 1 to the vast majority of picture elements in the image that indeed belong to a tooth, and small values or 0 to all others, so that the detected feature image of color-based tooth likelihood is effectively a black and white tooth shape image, the picture elements belonging to a tooth have values of 1 or close to 1, and picture elements outside of teeth are 0 or close to zero. The tooth likelihood can also be directly assigned to the color values of a picture element by determining its position in the teeth color probability distribution in the color space analyzed.

In a preferred embodiment the feature detection in a dentition area is restricted to the mouth opening of the image of the face of the patient by detecting the inner lip line (border line of the visible inner mouth area) in the image, and by further analyzing only the area within the detected lip line. The lip line is also overlaid in the two-dimensional image rendered from the three-dimensional model of the dentition and only the region inside the lip line is analyzed by said feature detection. This ensures that only features of the dentition in the respective images are utilized in the optimization process for finding the best fitting positioning for the virtual camera, and not any other features of the face of the patient.

In a preferred embodiment the feature detection is carried out in the two images by performing edge detection only. Edge detection is known as an image analysis method for artificial objects which normally have several well defined and straight edges. In connection with the present invention it has been found that it is possible to identify edges also in an image of a human dentition where edges are present between neighboring teeth, at the incisal edges of the teeth, and at the borderlines between gingiva and teeth. Edge detection can be carried out by Sobel filters or Laplace filters known in the field of image processing.

In a preferred embodiment the detected edges are subdivided in horizontal edges and vertical edges based on their average directions, wherein the horizontal and the vertical direction are perpendicular to each other and define the image coordinate system. The detected edges may be subdivided in horizontal edges and vertical edges based on whether their average directions are closer to the horizontal or vertical direction. In the preferred embodiment, the vertical and horizontal edges may be treated in the calculation of the measure of deviation of the edges in the image taken by the camera from the edges in the rendered image with different weights. Furthermore, in the calculation of the measure of deviation the edge features of a picture element belonging to a horizontal edge in one picture, but belonging to a vertical edge in the other, or vice versa, should not cancel out but rather result in a high contribution of this picture element to the measure of deviation.

Alternatively to the pure edge detection method the feature detection may be carried out in the method of the present invention by performing edge detection and color-based tooth likelihood determination, wherein from the differences of the detected edge images and from the differences of the detected tooth likelihood images a combined measure of deviation is calculated which is then minimized in the iterative minimization process to find the best fitting positioning. For example, for the detected edge images and the color-based tooth likelihood images two measures of deviation may first be determined separately which are then combined into a single measure of deviation.

In a preferred embodiment the measure of deviation is calculated by forming the difference image between the detected feature image of the image of the face of the patient recorded by the camera and the detected feature image of the rendered image, and by integrating the absolute values of the difference image over all picture elements of the difference image. If the detected features are in the same places in the respective images the respective detected features cancel out each other in the difference image such that in case of an ideal match the sum of the absolute values of the intensities of all picture elements in the difference image is zero.

The present invention further provides a computer implemented method for visualizing a two-dimensional image from a three-dimensional model of a dental situation, typically obtained from a three-dimensional model of the dentition of the patient by modifications of a dental treatment or any other dental modification, in an image of the face of the patient recorded by a camera, the image including the mouth opening of the patient, wherein the three-dimensional model of the dental situation of the patient's dentition is aligned to the image of the face of the patient recorded by the camera by performing the above described method according to the present invention. Then the two-dimensional image of the dental situation is rendered by applying the virtual camera to the three-dimensional model data of the dental situation using the best fitting positioning of the virtual camera, and the rendered image is overlaid in the image of the face of the patient taken by the camera. Then the resulting image of the face of the patient taken by the camera with the overlaid rendered two-dimensional image of the dental situation is displayed on a display.

In a preferred embodiment, before overlaying the rendered two-dimensional image of the dental situation, the area within the lip line of the image of the face of the patient taken by the camera is replaced by an oral cavity background which is generated from picture elements in the region between the upper and lower teeth arches. Such generation of a neutral background before the overlay of the rendered two-dimensional image of the dental situation is for example important if the dental situation includes shortened teeth in which case the "old" teeth in the image taken by the camera would still be visible after the overlay if the region within the lip line of the camera image has not been replaced by an oral cavity background before overlay of the rendered two-dimensional image of the dental situation.

According to the present invention there is also provided a system for visualizing a two-dimensional image of a dental situation of a patient rendered from three-dimensional model data of the dental situation in an image of the face of the patient recorded by a camera, the image including the mouth opening, the system comprising: a camera; a display; and a computing device which is operatively connected to the camera and to the display and which is arranged to carry out a method for visualizing a two-dimensional image obtained from a three-dimensional model of a dental situation in an image of the face of the patient recorded by a camera as defined above.

The method according to the present invention can be carried out for individual images. Alternatively, the method can also be carried out for subsequent video frames of a video recorded by a camera. In the latter case the patient may move his/her head with respect to the camera, wherein for each video frame the rendered two-dimensional image of the dental situation may be shown in the image of the face of the patient while the face is moving (turning), and the rendered image of the dental situation is shown for each image in the sequence of images in the right positioning within the mouth opening of the image of the face of the patient. This method can be carried out in real time such that a patient may turn the face with respect to the camera, and may at the same time see his face on a display with the rendered image of the dental situation overlaid in the mouth opening and positioned in the correct manner for each point of view.

The method can for example be implemented on a tablet computer which is normally also equipped with a camera so that the patient may hold the tablet computer to allow the camera to record the face, while the patient may look at the picture of his/her face on the display of the tablet, and may turn his face with respect to the tablet to visualize the rendered two-dimensional image of the dental situation within the mouth opening from all directions of view as desired.

BRIEF DESCRIPTION OF THE DRAWINGS

The invention will now be described with reference to examples in connection with the drawings in which.

DETAILED DESCRIPTION

Figure 3:
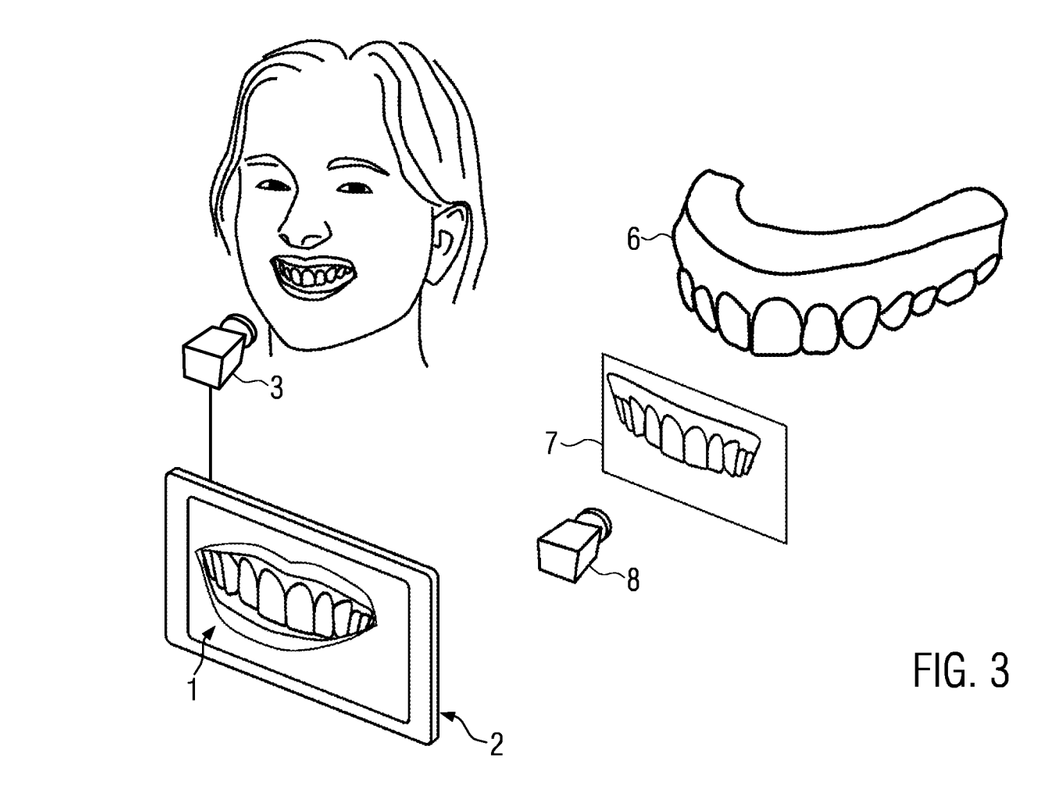
FIG. 3 shows an illustration of a computing device including a display and a camera for recording the mouth opening region of a patient and a schematic representation of a three-dimensional model of the dentition of a patient from which a two-dimensional image of the dental situation within the mouth opening area is rendered.

The invention will now first be generally described with reference to FIG. 3 showing a schematic representation of components and elements that are used when carrying out the method of the present invention. The present invention is a computer implemented method for aligning a three-dimensional model of a patient's dentition to an image of the face of the patient recorded by a camera. A first important element is the three-dimensional model of the dentition 6 of the patient. Such three-dimensional model of the dentition has been obtained by scanning and/or phototechnical acquisition of the oral cavity of the patient, or by scanning the shape of the dentition taken as impressions in plastic material in impression trays. In the schematic representation of FIG. 3 the three-dimensional model of the dental situation of the patient is symbolized by the upper jaw dentition 6.

As can be seen in the schematic representation of FIG. 3 a camera 3 connected to a computing device 2, such as a tablet computer, records an image of the face of a patient including the mouth opening. A virtual camera 8 is used in the computing device and acts on the three-dimensional model 6 to render a two-dimensional image 7 of the dentition of the patient, wherein an estimated position of the real camera 3 with respect to the face of the patient is used as a starting point for the position of the virtual camera 8. Since the estimated position of the camera 3 will deviate from the true position of the real camera 3 with respect to the face, there will be a certain deviation between the image 1 recorded by the camera 3 and the image 7 rendered by the virtual camera 8.

As will be explained in more detail below the positioning of the virtual camera 8 is varied in an iterative optimization process which utilizes detected features of the dentition in the mouth opening of the image recorded by the camera on the one hand, and detected features in the image of the three-dimensional model of the dentition rendered by the virtual camera on the other hand. A measure of deviation or an error between the respective detected feature images is calculated and successively minimized in an iterative optimization process to determine a best fitting positioning of the virtual camera. This best fitting positioning of virtual camera can then be used on modified three-dimensional models of the dentitions which are modified for example by a planned dental treatment and which are referred to as three-dimensional models of a dental situation in the present application. In this manner, a three-dimensional model of a dental situation which is derived from the three-dimensional model of the dentition of the patient and which may include replaced artificial teeth, dental restorations or corrected teeth positions can be visualized correctly positioned in the mouth opening of an image of the face of the patient displayed on a display.

Figure 1:
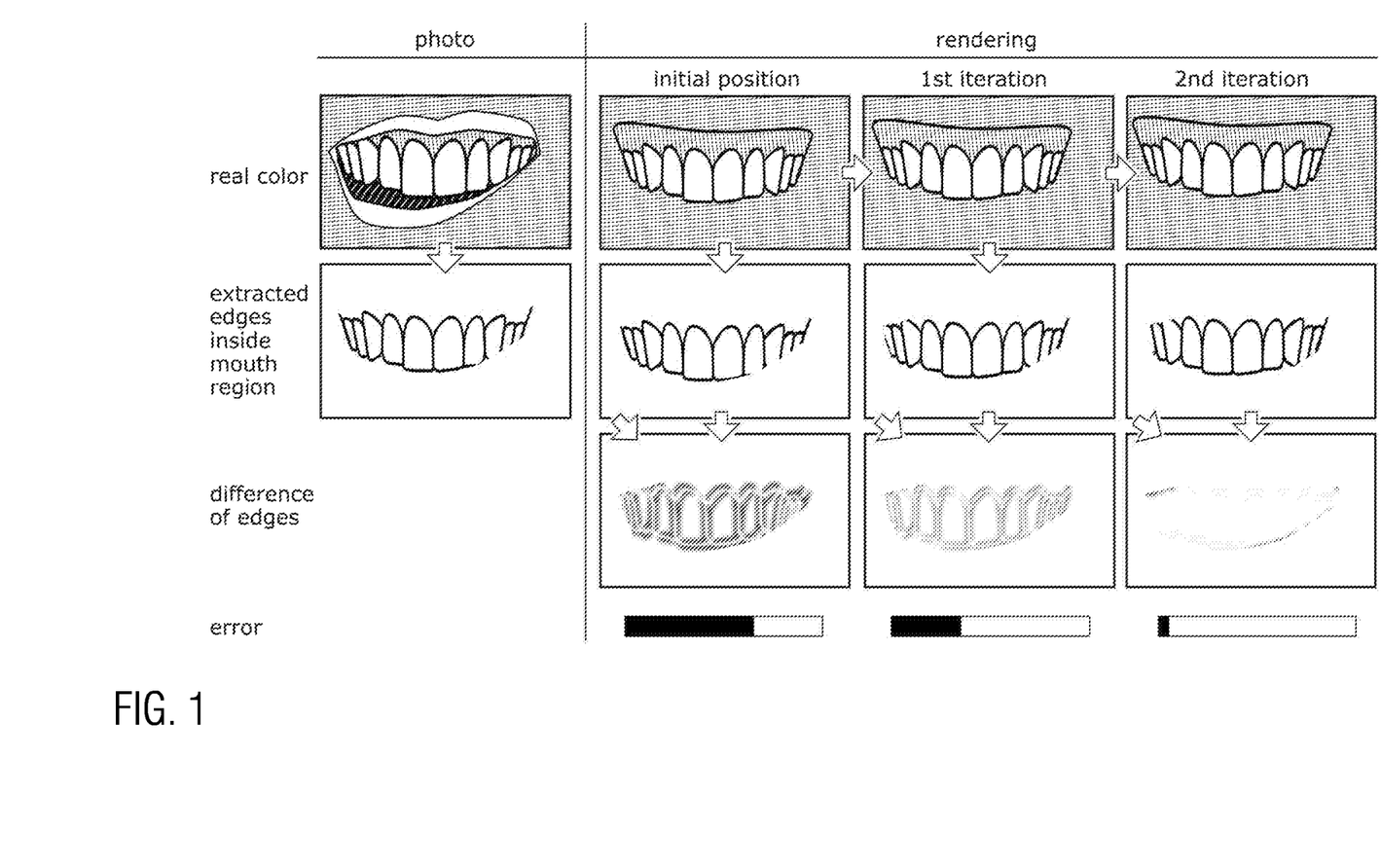
FIG. 1 shows an illustration including an image of a mouth region of a patient, a detected edge image of the mouth opening region of the recorded image as well as three iterations of images of the mouth region rendered by a virtual camera, the edges detected in the rendered images, and the differences of the edges detected in the image recorded by the camera and the respective edges detected in the rendered images, as well as a corresponding measure of deviation for the three iterations.

An example of feature detection in the images of the dentition is illustrated in FIG. 1, wherein edges are detected in the respective images of the dentition. In FIG. 1 an image including a mouth opening of a patient is shown in the first row on the left-hand side. In this image the lip line is detected, and the region inside the lip line is selected as mouth opening region which is the only region further analyzed in the procedure. In this image region of the mouth opening inside the lip line edge detection is performed which results in the detected edge image shown in the graph below the image recorded by the camera on the top on the left-hand side in FIG. 1. The detected edges are mostly the bordering lines between adjacent teeth, the incisal edges and the borderlines where teeth bases and gingiva meet. The second column of FIG. 1 shows a rendered image on top which has been created by applying the virtual camera to the three-dimensional model of the dentition of the patient at the estimated positioning which the camera 3 had when recording the image of the mouth opening of the patient in the first column on top. The lip line detected in the image recorded by the camera is extracted and transferred to the rendered image and overlaid therein to select the mouth opening region of the dentition in the rendered image. In this selected mouth opening region edge detection is performed in the same manner as in the image recorded by the camera which results in the detected edge image shown in the second column in the second row.

In order to determine a measure of deviation between the detected edges in the second row between the first and second column a difference image between the detected edge image of the image recorded by the camera and the detected edge image of the rendered image is formed which is shown in the second column in the third row. As can be seen there is some deviation because the detected edges are not positioned exactly in the same manner in the two detected edge images due to the inaccuracy of the estimated positioning of the camera. A measure of deviation is calculated from the difference image. In this example the measure of deviation is calculated by integrating the absolute values of the intensities of all picture elements in the difference image. This measure of deviation is designated as error in FIG. 1 and is as a bar graph in the lowest row of FIG. 1.

A numerical optimization process now varies the positioning of the virtual camera in a first iteration to a new estimated positioning. Then the process of rendering the corresponding image from the three-dimensional model of the dentition using the new estimated positioning, of edge detection in the rendered image, and of forming the difference image between the detected edges in the image recorded by the camera and the detected edges in the rendered image of the first iteration is repeated as illustrated in the third column of FIG. 1. As can be seen in the third line the difference image between the detected edges images of the image taken by the camera and the rendered image shows reduced intensities because the detected edges in the respective images are already in better agreement. It should be noted that this schematic illustration is highly simplified, in reality that would take a much higher number of iterations; if for example a gradient descent optimization algorithm is used the positioning variables are varied to numerically determine the gradient which already requires many iterations, as is well known in the art.

In FIG. 1 a second iteration is shown in the last column. In the difference image in the third row the integrated intensity is further reduced which means that the measure of deviation is likewise reduced and already considerably smaller as indicated in the lowest row compared to the error at the estimated initial position. This numerical optimization process is repeated until further iterations do not further reduce the measure of deviation within the given or predetermined accuracy of the calculation. The positioning of the virtual camera corresponding to the minimized measure of deviation is stored as best fitting positioning of the virtual camera.

Figure 2:
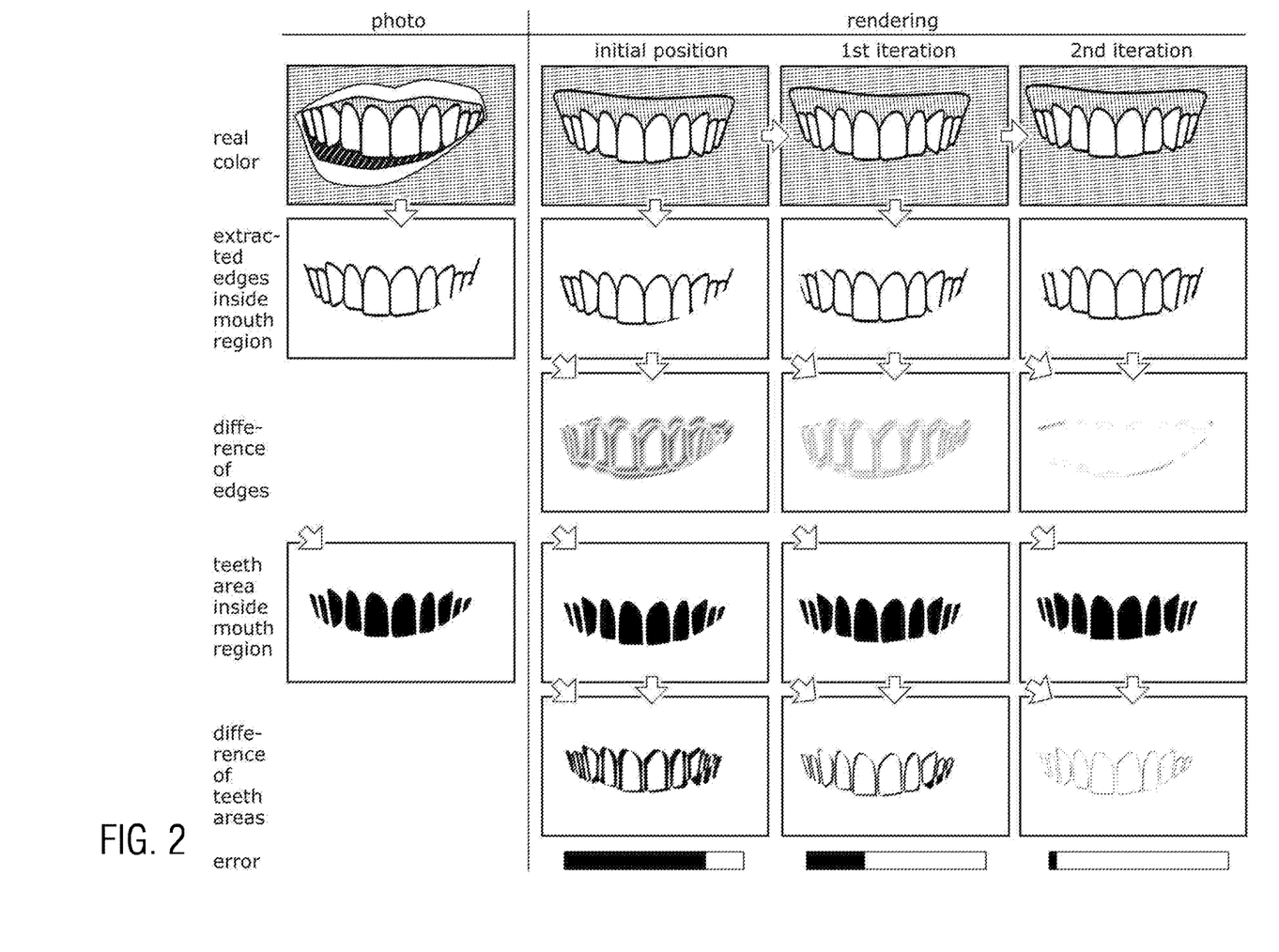
FIG. 2 shows a similar illustration as FIG. 1 and includes in addition to the detected edge images color-based tooth likelihood images, the differences of the tooth likelihood images of the image recorded by the camera and of the images rendered by the virtual camera.

FIG. 2 is a further illustration for an iterative optimization process optimizing the positioning of the virtual camera to fit to the positioning of the camera that recorded the real image including the mouth opening of the patient. The upper three rows show the same edge detection images and difference images between the detected edges in the image recorded by the camera and in the iteratively rendered images as shown in FIG. 1. In addition, the fourth row shows the result of a color-based tooth likelihood determination in the respective images in the mouth opening within the lip line. In this color-based tooth likelihood determination it is determined for the color values of each picture element the probability that it belongs to a teeth surface element. If for example a normalized probability density function for expected teeth color values is available this probability can be directly taken from the location of the color values in the probability distribution. In this manner the color of the teeth is differentiated from the color of the gingiva and the background of the oral cavity. As a result, the teeth visible in the images remain as black or mainly black objects with few grey elements in the images. In the fifth row the difference images between the detected color-based tooth likelihood image of the image recorded by the camera and the detected color-based tooth likelihood image of the rendered images are shown. Also, the differences between the color-based tooth likelihood images become less pronounced in successive iterations of the optimization process. The measure of deviation can then be formed as a first measure of deviation from the difference of the detected edges, for example by integrating the absolute values of the intensities over all picture elements of the difference image as described above. The same procedure can be applied to the difference image of the color-based tooth likelihood images for a second measure of deviation, wherein the first and second measure deviation may then be combined into a single measure of deviation designated as error in the last row of FIG. 2.

In this manner the positioning of the camera 3 when recording the image of the face of the patient can be approximated by a corresponding positioning of the virtual camera rendering the three-dimensional model of the dentition of the patient to reach an optimal alignment. The best fitting positioning of the virtual camera can then be used in further steps. Starting from the three-dimensional model of the dentition which represents the current status of the dentition of the patient a modified three-dimensional model of the dental situation can be used which differs from the three-dimensional model of the dental situation, e.g., to reflect the results of a potential dental treatment. The three-dimensional model of the dental situation after including the potential dental treatment may for example have one or more artificial teeth replacing the respective original teeth, or any other dental restorations. A further example of a dental situation may be the resulting corrected dentition after a teeth positioning correction treatment using dental braces. A further example of a dental situation may be based on the original dentition but include teeth position correction devices such as dental braces and retainers in place on the teeth of the dentition. The three-dimensional model of the dental situation representing the original state before any modification by a dental treatment is kept for further use in connection with the present invention, while the modified three-dimensional model of the dental situation after treatment is kept separately for further use. The modified three-dimensional model is referred to as the three-dimensional model of a dental situation for the patient. The virtual camera may then be applied to this three-dimensional model of the dental situation using the previously determined best fitting positioning of the camera to render an image of the dental situation. This rendered image may be inserted or overlaid in the mouth opening region of the image taken by the camera to provide a visualization of the dental situation.

In the following an example is given how the measure of deviation E may be calculated from the difference image of the detected edge images as the integrated absolute values of the intensities remaining in the difference image:

$$E = \sum_{i=0}^{n} |e(P)_i - e(R)_i|$$

E: error (measure of deviation)
i: pixel
n: number of pixels
e(X): edge image of image X
P: image recorded by camera
R: rendered image.

An improved measure of deviation taking into account, besides horizontal and vertical edges, color-based tooth likelihood values can be calculated as follows:

$$E = \sum_{i=0}^{n} w_h |e_h(P)_i - e_h(R)_i| + w_v |e_v(P)_i - e_v(R)_i| + w_t |t(P)_i - t(R)_i|$$

wherein:
w: weights
$e_h(X)$: horizontal edge image of image X (P or R)
$e_v(X)$: vertical edge image of image X (P or R)
t(X): teeth likelihood image of image X, may be based on color segmentation.
X=P image recorded by camera; X=R rendered image.

Teeth likelihood images are illustrated in a simplified manner in the fourth row of FIG. 2.

The invention claimed is:

1. A computer implemented method for aligning a three-dimensional model (6) of a patient's dentition to an image of the face of the patient recorded by a camera (3), the image including the mouth opening, the method comprising the steps of:
    estimating the positioning of the camera (3) relative to the face of the patient during recording of the image, and
    rendering a two-dimensional image (7) of the dentition using a virtual camera (8) processing the three-dimensional model (6) of the dentition, wherein the virtual camera (8) is operating using the estimated positioning of the camera (3),
    characterized by further comprising:
    retrieving the three-dimensional model (6) of the dentition of the patient,
    rendering a two-dimensional image (7) of the dentition of the patient using the virtual camera (8) processing the three-dimensional model of the dentition at the estimated positioning,
    carrying out feature detection in a dentition area in the mouth opening of the image (1) of the patient recorded by the camera (3) and in the rendered image (7) by performing edge detection and/or a color-based tooth likelihood determination in the respective images and forming a detected feature image for the or each detected feature, wherein feature detection is carried out by performing edge detection only, and wherein the detected edges are subdivided in horizontal edges and vertical edges based on their average directions,
    calculating a measure of deviation between the detected feature images of the image taken by the camera (3) and the detected feature image of the rendered image,
    varying the positioning of the virtual camera (8) to a new estimated positioning and repeating the preceding three steps in an optimization process to minimize the deviation measure to determine the best fitting positioning of the virtual camera (8).

2. The computer implemented method according to claim 1, characterized in that before determining the measure of deviation, the image of the face is analyzed to detect a lip line surrounding the mouth opening and only picture elements inside of the lip line are selected for determining the measure of deviation in the image recorded by the camera,
wherein the lip line is also overlaid in the two-dimensional image rendered from the three-dimensional model of the dentition and only the region inside the lip line is used for determining the measure of deviation.

3. The computer implemented method according to claim 1,
characterized in that feature detection is carried out by performing edge detection and color-based tooth likelihood determination, and
that a combined measure of deviation is calculated from the detected edge images and the detected color-based tooth likelihood images.

4. The computer implemented method according to claim 1,
characterized in that feature detection is carried out by performing color-based tooth likelihood determination only.

5. The computer implemented method according to claim 2,
characterized in that the measure deviation is calculated by forming the difference image of the detected feature image of the image of the face of the patient taken by the camera (3) and the detected feature image of the rendered image, and by integrating the absolute values of the intensity of the difference image over all picture elements of the difference image.

6. A computer implemented method for visualizing a two-dimensional image obtained from a three-dimensional model of a dental situation in an image of the face of a patient recorded by a camera, the image including the mouth opening of the patient, wherein the three-dimensional model of a dental situation is based on a three-dimensional model of the dentition of the patient and compared to the three-dimensional model of the dentition includes modifications due to dental treatment or any other dental modification, the method comprising the steps of:
aligning the three-dimensional model of the dentition of the patient to the image of the face of the patient recorded by the camera (3) by performing the method according to claim 1;
rendering a two-dimensional image (7) of the dental situation from the three-dimensional model of the dental situation using the virtual camera (8) using the determined best fitting positioning for the virtual camera;
overlaying the two-dimensional image of the dental situation rendered using the virtual camera in the image of the face of the patient recorded by the camera; and
displaying the image of the face of the patient taken by the camera with the overlaid rendered two-dimensional image of the dental situation on a display (2).

7. The computer implemented method according to claim 6,
wherein before the overlaying of the rendered two-dimensional image of the dental situation an oral cavity background image region within the lip line is generated from the image including the mouth opening in a region between the lower arch and the upper teeth arch, and the image region within the lip line in the image of the patient's face recorded by the camera is replaced by the generated oral cavity background image region.

8. The computer implemented method according to claim 6,
characterized in that, before the step of overlaying, the lip line detected in the image of the patient's face recorded by the camera is transferred to and overlaid in the rendered image and all picture elements outside the lip line in the rendered image are excluded thereby cutting out the area of the rendered image that corresponds to the mouth opening.

9. A system for visualizing a two-dimensional image of a dental situation of a patient rendered from three-dimensional model data of the dental situation in an image of the face of the patient recorded by a camera, the image including the mouth opening, the system comprising:
a camera (3);
a display; and
a computing device (2) which is operatively connected to the camera (3) and to the display, and which is arranged to carry out a method according to claim 6.

10. A Computer implemented method for aligning a three-dimensional model (6) of a patient's dentition to an image of the face of the patient recorded by a camera (3), the image including the mouth opening, the method comprising the steps of:
estimating the positioning of the camera (3) relative to the face of the patient during recording of the image, and
rendering a two-dimensional image (7) of the dentition using a virtual camera (8) processing the three-dimensional model (6) of the dentition, wherein the virtual camera (8) is operating using the estimated positioning of the camera (3),
characterized by further comprising:
retrieving the three-dimensional model (6) of the dentition of the patient,
rendering a two-dimensional image (7) of the dentition of the patient using the virtual camera (8) processing the three-dimensional model of the dentition at the estimated positioning,
carrying out feature detection in a dentition area in the mouth opening of the image (1) of the patient recorded by the camera (3) and in the rendered image (7) by performing edge detection and/or a color-based tooth likelihood determination in the respective images and forming a detected feature image for the or each detected feature,
calculating a measure of deviation between the detected feature images of the image taken by the camera (3) and the detected feature image of the rendered image,
varying the positioning of the virtual camera (8) to a new estimated positioning and repeating the preceding three steps in an optimization process to minimize the deviation measure to determine the best fitting positioning of the virtual camera (8),
wherein, before determining the measure of deviation, the image of the face is analyzed to detect a lip line surrounding the mouth opening and only picture elements inside of the lip line are selected for determining the measure of deviation in the image recorded by the camera,
wherein the lip line is also overlaid in the two-dimensional image rendered from the three-dimensional model of the dentition and only the region inside the lip line is used for determining the measure of deviation, and the measure deviation is calculated by forming a difference image of the detected feature image of the image of the face of the patient taken by the camera (3) and the detected feature image of the rendered image, and by integrating the absolute values of the intensity of the difference image over all picture elements of the difference image.

11. The computer implemented method according to claim 10, characterized in that feature detection is carried out by performing edge detection only.

12. The computer implemented method according to claim 11, characterized in that the detected edges are subdivided in horizontal edges and vertical edges based on their average directions.

13. The computer implemented method according to claim 10, characterized in that feature detection is carried out by performing edge detection and color-based tooth likelihood determination, and that a combined measure of deviation is calculated from the detected edge images and the detected color-based tooth likelihood images.

14. The computer implemented method according to claim 10, characterized in that feature detection is carried out by performing color-based tooth likelihood determination only.

15. A computer implemented method for visualizing a two-dimensional image obtained from a three-dimensional model of a dental situation in an image of the face of a patient recorded by a camera, the image including the mouth opening of the patient, wherein the three-dimensional model of a dental situation is based on a three-dimensional model of the dentition of the patient and compared to the three-dimensional model of the dentition includes modifications due to dental treatment or any other dental modification, the method comprising the steps of:

aligning the three-dimensional model of the dentition of the patient to the image of the face of the patient recorded by the camera (3) by performing the method according to claim 10;

rendering a two-dimensional image (7) of the dental situation from the three-dimensional model of the dental situation using the virtual camera (8) using the determined best fitting positioning for the virtual camera;

overlaying the two-dimensional image of the dental situation rendered using the virtual camera in the image of the face of the patient recorded by the camera; and displaying the image of the face of the patient taken by the camera with the overlaid rendered two-dimensional image of the dental situation on a display (2).

16. The computer implemented method according to claim 15, wherein before the step of overlaying of the rendered two-dimensional image of the dental situation an oral cavity background image region within a lip line is generated from the image including the mouth opening in a region between the lower arch and the upper teeth arch, and the image region within the lip line in the image of the patient's face recorded by the camera is replaced by the generated oral cavity background image region.

17. The computer implemented method according to claim 15, characterized in that, before the step of overlaying, a lip line detected in the image of the patient's face recorded by the camera is transferred to and overlaid in the rendered image and all picture elements outside the lip line in the rendered image are excluded thereby cutting out the area of the rendered image that corresponds to the mouth opening.

18. A system for visualizing a two-dimensional image of a dental situation of a patient rendered from three-dimensional model data of the dental situation in an image of the face of the patient recorded by a camera, the image including the mouth opening, the system comprising:

a camera (3);

a display; and a computing device (2) which is operatively connected to the camera (3) and to the display, and which is arranged to carry out a method according to claim 10.

* * * * *